(12) United States Patent
Avestruz et al.

(10) Patent No.: US 12,394,986 B2
(45) Date of Patent: Aug. 19, 2025

(54) POWER PROCESSING AND ENERGY STORAGE

(71) Applicant: The Regents of the University of Michigan, Ann Arbor, MI (US)

(72) Inventors: Al-Thaddeus Avestruz, Ann Arbor, CA (US); Xiaofan Cui, Ann Arbor, CA (US); Jason Siegel, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 120 days.

(21) Appl. No.: 18/556,782

(22) PCT Filed: Apr. 22, 2022

(86) PCT No.: PCT/US2022/025990
§ 371 (c)(1),
(2) Date: Oct. 23, 2023

(87) PCT Pub. No.: WO2022/226335
PCT Pub. Date: Oct. 27, 2022

(65) Prior Publication Data
US 2024/0195171 A1     Jun. 13, 2024

Related U.S. Application Data

(60) Provisional application No. 63/178,638, filed on Apr. 23, 2021.

(51) Int. Cl.
*H02J 3/32*     (2006.01)
*H02J 1/12*     (2006.01)
(Continued)

(52) U.S. Cl.
CPC ................. *H02J 3/32* (2013.01); *H02J 1/12* (2013.01); *H02J 3/38* (2013.01); *H02J 7/0024* (2013.01);
(Continued)

(58) Field of Classification Search
CPC ........ H02J 3/32; H02J 1/12; H02J 3/38; H02J 7/0024; H02J 7/35; H02J 2300/24; B60L 53/16; Y02E 10/56
See application file for complete search history.

(56) References Cited

U.S. PATENT DOCUMENTS 6,853,920 B2    2/2005   Hsiung
6,865,509 B1    3/2005   Hsiung
(Continued)

OTHER PUBLICATIONS

Cui et al., "Lite-Sparse Hierarchical Partial Power Processing for Parallel Batteries in Heterogeneous Energy Storage Systems", 2021 IEEE 22nd Workshop on Control and Modelling of D3 Power Electronics, pp. 1-8, Nov. 2, 2021.
(Continued)

*Primary Examiner* — Daniel Cavallari
(74) *Attorney, Agent, or Firm* — Lempia Summerfield Katz LLC

(57) ABSTRACT

A power conversion device may perform model-referenced power processing for multiple diverse power nodes. The power conversion device includes interconnects that couple power nodes connection ports to power converters. The power converters include a dense tier of power converters sized to correct from varied power flow levels of a defined portion of a population of power nodes to interim power flows in accord with center values for that portion of power nodes. The center values are provided by a model of the power node diversity. The power converters also include a sparse tier. The sparse tier performs power processing to convert from the interim power flows generated by the dense tier to a uniform model-corrected target flow.

20 Claims, 10 Drawing Sheets

(51) Int. Cl.
   *H02J 3/38* (2006.01)
   *H02J 7/00* (2006.01)
   *H02J 7/35* (2006.01)
   *B60L 53/16* (2019.01)

(52) U.S. Cl.
   CPC .............. *H02J 7/35* (2013.01); *B60L 53/16* (2019.02); *H02J 2300/24* (2020.01)

(56) References Cited

U.S. PATENT DOCUMENTS

| | | |
|---|---|---|
| 6,917,845 B2 | 7/2005 | Hsiung |
| 6,985,779 B2 | 1/2006 | Hsiung |
| 7,031,778 B2 | 4/2006 | Hsiung |
| 7,136,716 B2 | 11/2006 | Hsiung |
| 7,272,530 B2 | 9/2007 | Hsiung |
| 7,313,447 B2 | 12/2007 | Hsiung |
| 7,912,561 B2 | 3/2011 | Hsiung |
| 8,352,049 B2 | 1/2013 | Hsiung |
| 8,558,510 B2 | 10/2013 | Moon |
| 9,489,701 B2 | 11/2016 | Emadi |
| 12,027,963 B2 | 7/2024 | Avestruz et al. |
| 2002/0002414 A1 | 1/2002 | Hsiung |
| 2003/0083756 A1 | 5/2003 | Hsiung |
| 2003/0109951 A1 | 6/2003 | Hsiung |
| 2003/0144746 A1 | 7/2003 | Hsiung |
| 2005/0159922 A1 | 7/2005 | Hsiung |
| 2005/0216114 A1 | 9/2005 | Hsiung |
| 2006/0259163 A1 | 11/2006 | Hsiung |
| 2008/0103751 A1 | 5/2008 | Hsiung |
| 2011/0140667 A1 | 6/2011 | Moon |
| 2012/0041574 A1 | 2/2012 | Hsiung |
| 2014/0129040 A1 | 5/2014 | Emadi |
| 2019/0313531 A1 | 10/2019 | Silva |
| 2020/0343040 A1 | 10/2020 | Rizzolatti |

OTHER PUBLICATIONS

Extended European Search Report from European Patent Application No. 22792595.5, dated Feb. 18, 2025, 8 pages.
120W Industrial Quarter Brick Converters, GQA120 Series; TDK Lambda; Jul. 2020; 3 pp.
12V 12AH Lithium Ion Battery; https://web.archive.org/web/20170701165223/https://www.lithiumion-batteries.com/products/12v-12ah-lithium-ion-battery/; CHARGEX; Jul. 2017; 6 pp.
12V 4 Bank 10A Lithium Ion Battery Charger; https://web.archive.org/web/20200929081417/https://www.lithiumion-batteries.com/products/lithium-ion-chargers/12v-lithium-ion-battery-chargers/four-bank-10a-lithium-ion-battery-charger.php; CHARGEX; Sep. 2020; 4 pp.
250W, 9 to 40V Input Non-Isolated Step-Down DC-DC Buck Converter; i6A Series; TDK Lambda; Aug. 2021; 6 pp.
B. Borlaug, S. Salisbury, M. Gerdes, and M. Muratori, Levelized Cost of Charging Electric Vehicles in the United States; Joule, vol. 4, No. 7, pp. 1470-1485, 2020.
C. Hua and Y. Fang; A Charge Equalizer With a Combination of APWM and PFM Control Based on a Modified Half-Bridge Converter; in IEEE Transactions on Power Electronics, vol. 31, No. 4, pp. 2970-2979, Apr. 2016, doi: 10.1109/TPEL.2015.2453438.
C. Pastor-Fernandez, T. Bruen, W. Widanage, M. Gama-Valdez, and J. Marco, A study of cell-to-cell interactions and degradation in parallel strings: Implications for the battery management system; Journal of Power Sources, vol. 329, pp. 574-585, Oct. 2016.
C.-S. Moo, K. S. Ng, and Y.-C. Hsieh, Parallel operation of battery power modules; IEEE Transactions on Energy Conversion, vol. 23, No. 2, pp. 701-707, 2008.
E. Candan, D. Heeger, P. S. Shenoy, and R. C. Pilawa-Podgurski, A series-stacked power delivery architecture with hot-swapping for high-efficiency data centers; 2015 IEEE Energy Conversion Congress and Exposition, ECCE 2015, pp. 571-578.

E. Hossain, D. Murtaugh, J. Mody, H. M. R. Faruque, M. S. H. Sunny, and N. Mohammad, A comprehensive review on second-life batteries: Current state, manufacturing considerations, applications, impacts, barriers & potential solutions, business strategies, and policies; IEEE Access, vol. 7, pp. 73215-73252, 2019.
F. Boico, B. Lehman, and K. Shujaee, Solar battery chargers for NiMH batteries; IEEE 36th Conference on Power Electronics Specialists, 2005 IEEE, pp. 146-152.
G. Rancilio, A. Lucas, E. Kotsakis, G. Fulli, M. Merlo, M. Delfanti, and M. Masera, Modeling a large-scale battery energy storage system for power grid application analysis; Energies, vol. 12, p. 3312, 2019.
H. Engel, P. Hertzke, and G. Siccardo, Second-life EV batteries: The newest value pool in energy storage; McKinsey & Company; Tech. Tep., 2019, 5 pp.
H. Zhou, J. Zhao, and Y. Han, PV balancers: Concept, architectures, and realization; IEEE Transactions on Power Electronics, vol. 30, No. 7, pp. 3479-3487, Jul. 2015.
International Preliminary Report on Patentability cited in corresponding international patent application No. PCT/US2022/025990; Oct. 24, 2023; 4 pp.
International Search Report and Written Opinion cited in corresponding international patent application No. PCT/US2022/025990; Aug. 9, 2022; 6 pp.
J. Biela, M. Schweizer, S. Waffler, and J. W. Kolar, SiC versus Si-Evaluation of potentials for performance improvement of inverter and DC-DC converter systems by SiC power semiconductors; IEEE Transactions on Industrial Electronics, vol. 58, pp. 2872-2882, Jul. 2011.
J. Neubauer, K. Smith, E. Wood, and A. Pesaran, Identifying and Overcoming Critical Barriers to Widespread Second Use of PEV Batteries; National Renewable Energy Laboratory (NREL), Feb. 2015, 93 pp.
J. Wang, D. Wu, W. Zhao, S. Shi, B. Upadhaya, and Y. Shi, Queueing Theory-Based Optimal Decision-Making Model of Battery Energy Storage-Assisted Fast Charging Station Participating in Emergency Demand Response; iSPEC 2020—Proceedings: IEEE Sustainable Power and Energy Conference; 2020, pp. 2110-2115.
K. J. Arrow, Decision Theory and Operations Research; Operations Research, vol. 5, pp. 765-774, Dec. 1957.
K. Mongird, V. Fotedar, V. Viswanathan, V. Koritarov, P. Balducci, B. Hadjerioua, and J. Alam, Energy storage technology and cost characterization report; Pacific Northwest National Laboratory, Jul. 2019, pp. 1-120.
L. C. Casals, B. Amante Garcia, and C. Canal; Second life batteries lifespan: Rest of useful life and environmental analysis; Journal of Environmental Management, vol. 232, pp. 354-363, 2019.
L. Gaines, Q. Dai, J. T. Vaughey, and S. Gillard; Direct recycling R&D at the recell center; Recycling, vol. 6, No. 2, p. 31, 2021.
L. Yang and H. Ribberink, Investigation of the potential to improve DC fast charging station economics by integrating photovoltaic power generation and/or local battery energy storage system; Energy, vol. 167, 2019, 48 pp.
L. Yao, W. H. Lim, and T. S. Tsai, A Real-Time Charging Scheme for Demand Response in Electric Vehicle Parking Station; IEEE Transactions on Smart Grid, vol. 8, No. 1, pp. 52-62, Jan. 2017.
LiNiMnCo 26650 Battery Pack: 14.4V 20Ah (288Wh, 30A rate, 4Rx4C); https://web.archive.org/web/20200926173806/https://www.batteryspace.com/LiNiMnCo-26650-Battery-Pack-14.4V-20Ah-288Wh-30A-rate.aspx; AA Portable Power Corp., Sep. 2020; 2 pp.
LiNiMnCo 26650 Battery: 14.4V 10Ah (144Wh, 10A rate) in Aluminum-Box; https://web.archive.org/web/20180627185637/http://www.batteryspace.com/linimnco-26650-battery-14-4v-10ah-144wh-10a-rate-in-aluminum-box.aspx; AA Portable Power Corp., Jun. 2018; 2 pp.
M. Al-Amin, A. Barai, T. Ashwin, and J. Marco, An insight to the degradation behaviour of the parallel connected lithium-ion battery cells; Energies, vol. 14, No. 16, p. 4716, Aug. 2021.
M. D'Arpino and M. Cancian, Design of a grid-friendly DC fast charge station with second life batteries; SAE Technical Papers, Apr. 2019, SAE International, 1 pp—abstract only.
M. Evzelman, M. M. Ur Rehman, K. Hathaway, R. Zane, D. Costinett, and D. Maksimovic, Active Balancing System for Elec-

(56) References Cited

OTHER PUBLICATIONS tric Vehicles With Incorporated Low-Voltage Bus; IEEE Transactions on Power Electronics, vol. 31, No. 11, 2016, 8 pp.
M. Faisal, M. A. Hannan, P. J. Ker, A. Hussain, M. B. Mansor, and F. Blaabjerg, Review of energy storage system technologies in microgrid applications: Issues and challenges; IEEE Access, vol. 6, pp. 35143-35164, 2018.
M. J. Brand, M. H. Hofmann, M. Steinhardt, S. F. Schuster, and A. Jossen, Current distribution within parallel-connected battery cells; Journal of Power Sources, vol. 334, pp. 202-212, Dec. 2016.
M. Slattery, J. Dunn, and A. Kendall; Transportation of electric vehicle lithium-ion batteries at end-of-life: A literature review; Resources, Conservation and Recycling, vol. 174, p. 105755, 2021.
N. Mukherjee and D. Strickland, Control of second-life hybrid battery energy storage system based on modular boost-multilevel buck converter; IEEE Transactions on Industrial Electronics, vol. 62, 2015, 12 pp.
NKL, Guidelines for the realisation of charging plazas; The Netherlands Knowledge Platform for Public Charging Infrastructure (NKL), Tech. Rep., 2019, 16 pp.
P. B. L. Neto, O. R. Saavedra, and L. A. De Souza Ribeiro, A Dual-Battery Storage Bank Configuration for Isolated Microgrids Based on Renewable Sources; IEEE Transactions on Sustainable Energy, vol. 9, 2018, 10 pp.
P. S. Shenoy, K. A. Kim, B. B. Johnson and P. T. Krein; Differential Power Processing for Increased Energy Production and Reliability of Photovoltaic Systems; IEEE Transactions on Power Electronics, vol. 28, No. 6, pp. 2968-2979, Jun. 2013.
P.-H. La and S.-J. Choi, Synthesis of balancing topologies for parallel-connected battery cells by principle of duality; 2019 10th International Conference on Power Electronics and ECCE Asia (ICPE 2019—ECCE Asia). IEEE, May 2019, 55 pp.
PSL-BTC-12120 Lithium Bluetooth Series; https://web.archive.org/web/20190416121754/https://www.power-sonic.com/product/psl-btc-12120/; Power Sonic Corp., Apr. 2019; 6 pp.
Q. Yang, S. Sun, S. Deng, Q. Zhao, and M. Zhou, Optimal Sizing of PEV Fast Charging Stations with Markovian Demand Characterization; IEEE Transactions on Smart Grid, vol. 10, No. 4, 2019, 11 pp.
S. Deb, K. Tammi, K. Kalita, and P. Mahanta, Impact of electric vehicle charging station load on distribution network; Energies, vol. 11, No. 1, pp. 1-25, 2018.
S. Freeland; Techniques for the practical application of duality to power circuits; IEEE Transactions on Power Electronics, vol. 7, No. 2, pp. 374-384, 1992.
S. J. Tong, A. Same, M. A. Kootstra, and J. W. Park, Off-grid photovoltaic vehicle charge using second life lithium batteries: An experimental and numerical investigation; Applied Energy, vol. 104, pp. 740-750, Apr. 2013.
S. Leonori, G. Rizzoni, F. M. Frattale Mascioli, and A. Rizzi, Intelligent energy flow management of a nanogrid fast charging station equipped with second life batteries; International Journal of Electrical Power and Energy Systems, vol. 127, 2021, p. 106602.
S. Saravanan, P. Pandiyan, T. Chinnadurai, T. Ramji, N. Prabaharan, R. S. Kumar, and P. L. Pugalhanthi, Reconfigurable battery management system for microgrid application; Microgrid Technologies, pp. 145-176, Mar. 2021.
S. Saxena, C. Hendricks, and M. Pecht, Cycle life testing and modeling of graphite/LiCoO2 cells under different state of charge ranges; Journal of Power Sources, vol. 327, pp. 394-400, 2016.
Severson, K. A. et al.; Data-driven prediction of battery cycle life before capacity degradation; Nature Energy, 4(5), pp. 383-391; 2019; https://doi.org/10.1038/s41560-019-0356-8.
Smart Charger (6.0A) for 14.8V Li-ion/Polymer Rechargeable Battery Pack; https://web.archive.org/web/20180211062950/http://www.batteryspace.com/Smart-Charger-6.0A-for-14.8V-Li-ion/Polymer-Rechargeable-Battery-Pack.aspx; AA Portable Power Corp., Feb. 2018; 2 pp.
T. Bruen and J. Marco, Modelling and experimental evaluation of parallel connected lithium ion cells for an electric vehicle battery system; Journal of Power Sources, vol. 310, pp. 91-101, Apr. 2016.
T. S. Bryden, G. Hilton, B. Dimitrov, C. Ponce De Leon, and A. Cruden, Rating a Stationary Energy Storage System Within a Fast Electric Vehicle Charging Station Considering User Waiting Times; IEEE Transactions on Transportation Electrification, vol. 5, No. 4, 2019, 11 pp.
X. Cui, A. Ramyar, J. Siegel, P. Mohtat, A. Stefanopoulou, and A.-T. Avestruz, Grid Interfaces to Electric Vehicle Chargers Using Statistically-Structured Power Conversion for Second-Use Batteries as Energy Buffering; https://arxiv.org/abs/2104.14976v1, 2021, 11 pp.
X. Cui, A. Ramyar, P. Mohtat, V. Contreras, J. Siegel, A. Stefanopoulou, and A.-T. Avestruz, Optimizing Partial Power Processing for Second-Use Battery Energy Storage Systems; https://arxiv.org/abs/2106.11749v1; Jun. 2021, 10pp.
X. Gong, R. Xiong, and C. C. Mi, Study of the characteristics of battery packs in electric vehicles with parallel-connected lithium-ion battery cells; 2014 IEEE Applied Power Electronics Conference and Exposition—APEC 2014. IEEE, Mar. 2014, pp. 3218-3224.
Y. Wang and J. S. Thompson, Two-stage admission and scheduling mechanism for electric vehicle charging; IEEE Transactions on Smart Grid, vol. 10, No. 3, 2019, 12 pp.
Y. Xiong, B. Wang, C. C. Chu, and R. Gadh, Vehicle grid integration for demand response with mixture user model and decentralized optimization; Applied Energy, vol. 231, pp. 481-493, 2018.
Z. Zhang, H. Gui, D. J. Gu, Y. Yang, and X. Ren, A hierarchical active balancing architecture for lithium-ion batteries; IEEE Transactions on Power Electronics, vol. 32, No. 4, 2017, 25 pp.

POWER PROCESSING AND ENERGY STORAGE

PRIORITY

This U.S. National Phase application is based on International Application No. PCT/US2022/025990, filed Apr. 22, 2022, which claims the benefit of U.S. provisional application entitled "Partial Power Processing Conversion Architectures," filed Apr. 23, 2021, bearing, and assigned Ser. No. 63/178,638, the entire disclosures of which are hereby expressly incorporated by reference. Priority benefit of these earlier filed applications is hereby claimed.

BACKGROUND

Technical Field

The disclosure relates generally to power processing and energy storage.

Brief Description of Related Technology

In recent years, green technologies for power generation and storage have undergone widespread adoption. For example, many gigawatts of solar cells were installed in the US alone last year. In another example, advanced power storage installations exceeded the gigawatt threshold in the US in 2020. Forecasts and current incentive systems indicate that this trend of increasing installations will continue in the coming years. Accordingly, there is increasing demand for systems for efficiently and cheaply connecting green technology power nodes (e.g., power sinks and/or power sources) to the grid and for efficiently and cheaply adapting their power output for a variety of other applications. Improvements to power adaption technologies will continue to drive industrial demand.

DETAILED DESCRIPTION

Figure 1:
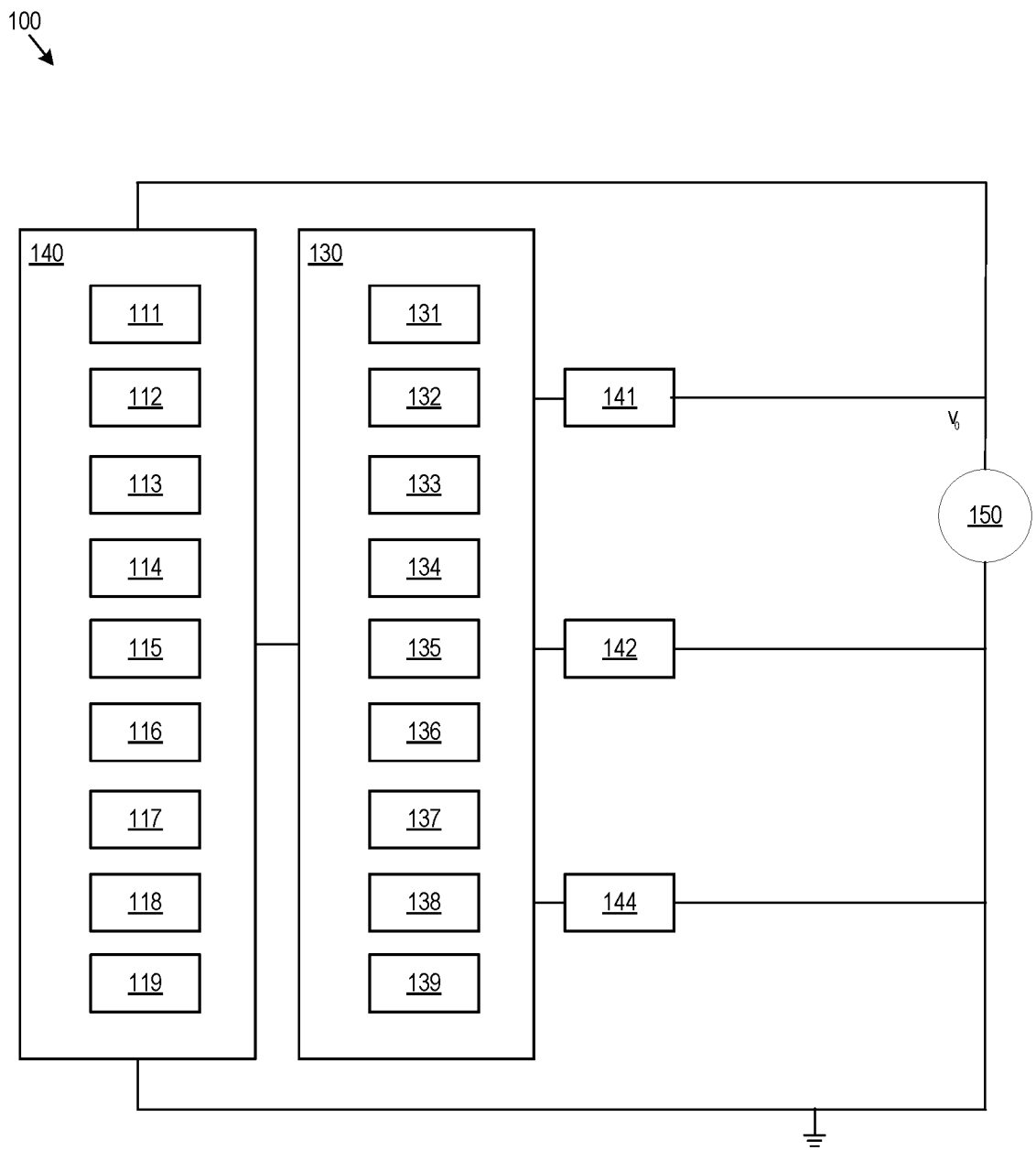
FIG. 1 shows an example power conversion device.

In various contexts, a power source, such as a power store (e.g., a battery, fuel cell, or other power store), solar cell, wind turbine, chemical process, or other power source, may output power in a state (e.g., voltage, wattage, current, direct current, alternating current, or other characterization metric) that does not match a target output for a system incorporating the power source. Various contexts may have mismatch between multiple power sinks connected in a unified system (e.g., battery chargers, motors, or other power consuming devices). In other words, a system may have heterogeneity resulting from various power nodes (e.g., power sources and/or power sinks) in the system.

Using batteries as an illustrative example, batteries that may be uniform or otherwise non-diverse (e.g., at the time of manufacture, installation, or other life cycle point) may degrade at different rates, in some cases, including contexts of uniform and/or load balanced usage. Thus, an initially uniform set of batteries may degrade such that the output of the example set differs from the target output of the system. Further, the deviation from the target (or the expected contribution to the target) output by individual batteries in the example set may differ from battery to battery. Diverse degradation may occur at various levels of battery technology, for example different battery packs may degrade differently, further within those packs modules and/or individual cells may have diverse degradation. Batteries may refer to any portion of battery technologies and/or other technologies that behavior as a power storage unit. For example, multiple battery packs, modules, cells, chargers, controllers, power converters, or other battery internals connected via virtually any set of electrical interconnects may, in some cases, be referred to as a single "battery". Further, power stores (such as batteries) may in various contexts behave as power sources, power sinks (e.g., while charging), or other power nodes. Solar cell/array power generation may differ as a result of transient and/or spatially variant irradiance profiles, cell degradation, cell obfuscation (e.g., via dust or other detritus), or other non-uniform interference with power generation.

As an illustrative scenario, second use of retired electric vehicle (EV) battery packs (e.g., as residential power backup or other power backup) may require installation of battery packs that have already undergone degradation as a result of usage. Further, battery packs span a wide range of capacities, ratings, and form factors for a wide array of vehicles. The diversity may increase as technologies for faster charging and newer battery chemistries emerge. This diversity is not only reflected in the second use packs for energy storage, but also in the charging of different vehicles within a station. However, during these periods of rapid change, markets may in part resist some standardization since improvements in battery performance provide benefits to producers able to incorporate new technologies when advances outweigh the benefits of standardization.

Similar trade-offs exist between standardization and incorporation of new technology with other power nodes.

In various implementations, systems may implement power converters to convert the power from at power node into the state used at the output port. In various implementations, full power processing (FPP) may include placing a power converter between the power node and the target port to convert the power at the power node to that of the target port. In some cases, a converter may be paired to each node in a group tied to a target port. The converter may process all of the power from the node.

In some cases, partial power processing (PPP) may be implemented. Although the number of converters may be dependent (e.g., equal or similar to) the number of power nodes, the PPP converters may process less than all of the power at the nodes. Instead, processing may be focused on a portion of the power to adjust the power from the power nodes to an output state. In some cases, PPP may reduce the overall power processed. In some cases, PPP operations may increase efficiency relative to FPP because PPP (even with otherwise identical converters) does not process the full power of the system. Accordingly, per converter inefficiencies are reduced by the relative size of the portion being processes. For example, a FPP system processing 100% with 5% loss will lose 5% of the power of the system. A PPP configuration with the same converters processing 10% of the power, will lose 0.5%. Other efficiencies such as reduced internal heating may be gained.

For example, differential power processing (DPP) may operate to on the portion of the power that differs from the target state. In some cases, the power nodes may differ only on a given range (e.g., X % to Y %, where Y>X). Accordingly, power converter set, each individually capable of handling the maximum deviation of the range (e.g., Y %), may be sufficient to support power conversion. In some cases, the cost of a power converter may scale with the processing capacity of the converter. Accordingly, systems configured to employ PPP and/or DPP may have cost savings advantages over FPP systems. However, some FPP systems may operate where no information about current operation condition/future operational condition of power node is known. For example, DPP and PPP may have operational tolerance ranges where a particular output may be delivered. If a set of power nodes falls outside the range (or for example degrades to the point it is outside the range after installation), the PPP system may fail.

In some cases, statistical, empirical, and/or theoretical models may provide information of power node condition. For example, a model of battery degradation versus use and/or time may provide a distribution of states for a given second-use battery population. Accordingly, such a model may provide predictive information on a set of batteries drawn from such a population.

For example, a particular population (or other group) of power nodes may be diverse for one or more reasons such as degradation, model type, or other diversity factors. A diversity model, including models generated from power node characterizations, statistical models, or other models of power node performance, may be used to provide information on the expected characteristics of a power node selected from that particular population. Further, using the diversity model the population can be divided into defined portions. The defined portions may be statistical portions, such as percentile ranges, individual node assignments, characterization based assignments or other groupings. Once, divided into portions, the portions may be treated specifically, such that electrical coupling to members of that portion may be specific to the characteristics of that power node portion. Thus, systems using diverse power nodes may anticipate power converter sizing requirements. Accordingly, power converters with lower conversion capacity may be used because the uncertainty if the amount of necessary conversion capacity is reduced.

Therefore, a system capable of processing a set of power nodes with conditions estimated by a model may allow comparatively robust performance to blind and/or limited characterization implementations, while not requiring detailed characterization of individual power nodes in the set. Further, a system capable of making model-referenced corrections may allow for more uniform construction of power processing systems rather than relying on highly power-node-set-specific interconnects and power converter units.

In various implementations, a sparse set (e.g., a group, a tier (with a hierarchical relationship with another set of power converters), multiple hierarchical tiers within the set itself, or other configuration) of power converters may be selected to correct from a model-referenced estimates of power node variation for a set of power nodes. The sparse set may include a number of power converters that is dependent on the power node differences as estimated by the model. Thus, in some cases, the number of power converters in the sparse set may be fewer than the number of power nodes serviced by the power converters. As an illustrative example scenario, an example model may estimate that set of nine power nodes (selected by a population of power nodes governed by the model) may be (on-average) interconnected to three power converters for adjustment among the power nodes. In the illustrative example scenario, the three power converters may rebalance outputs/inputs from various ones of the power nodes to ensure a particular power. In some cases, the three power converters may process input over a range to allow for uncertainty associated with choosing a finite number of power converters from the population. The distribution of a finite number of power converters selected from a population may not necessarily align with the distribution of the population as whole.

In some cases, the power nodes may be connected to the system and operate without individual characterization. The model may be the single node for estimating the condition of the power nodes. The nodes may be connected and assumed to operate within some tolerance of the model estimates.

In some cases, characterizations such as voltage level outputs, specifications for the power node when new, and/or other information that can be measured without alteration of the power node (or costs rivalling that of the power processing system itself) may be performed. In some cases, the processing system may include characterization elements such as voltage testing capabilities. In some cases, the characterization may be used for initialization, dynamic configuration, and/or other configuration of the system. Characterization may be used to facilitate interconnection of the power nodes that approximates the estimates (e.g., expected values) of power node differences provided by the diversity model.

In some cases, correction from the diversity model to a uniform model-corrected target power may occur in stages. In various implementations, the sparse set may be implemented as one or more sparse tiers, where power processing may proceed sequentially from tier-to-tier. In some cases, power processing at a sparse converter may occur after power conversion at one or more dense sets of power converters and provide an adjustment that is earlier in series (by current flow) than other power conversion that may be done (e.g., for another power node connected later in a series). Accordingly, tiers may be, in some cases, defined by a localized order from (e.g., from dense to sparse) that may not necessarily align with a device-wide current flow.

In some cases, between the one or more sparse tiers and the power nodes, the system may include a dense set of power converters (which may include one or more dense tiers). In some cases, dense tiers may be used to correct for uncertainty from deviation of individual power nodes to center (or other target values) values for the particular portions of the power node population. For example, a specific installed group of batteries (power nodes) may have a second-use battery that degraded less than expected for its particular portion of the population and other that has degraded more than expected. In addition, the status of all of these batteries may continue to change over time during this second-use installation. A dense set of power converters may adjust the power from the batteries to more closely match the center values that would be predicted by the model. Then, a sparse set of power converters may correct from the model distribution to the uniform model-corrected target power. In some cases, the dense set may include a number of power converters that is proportional to the total number of power nodes (for example, equal to, one less than, or other number directly dependent on the number of power nodes).

In various implementations, the deviation of individual batteries from the model estimates may be (on average) smaller in magnitude than the correction from the model to the target power. Accordingly, the processing capacity of power converters in the dense set may be smaller than that of those in the sparse set. In some cases, the cost of a power converter may scale with power processing capacity. Hence, in various implementations, a hierarchical system with a dense set of power converters and a sparse set of power converters may have more power converters than a PPP system (as discussed above). The number of power converters in the dense set would be similar to the total number of power converters in the PPP system. However, in some cases, the processing capacity of the individual ones of dense set of converters may be smaller than the individual power converters of the PPP system. For example, the capacity of the individual power converters of the PPP system may be more similar to the power processing capacity of the sparse set of converters. Accordingly, despite having more power converters, the hierarchical system may still be lower cost than a similarly performing PPP system (which is already lower cost than similarly performing FPP system).

In various implementations where the diversity model is used to subdivide a group of power nodes into portions, the sparse tier may be specifically constructed and used to generate a uniform model-corrected target power, by correcting from center values (or other interim values generated by dense tier correction). The dense tier power converters may be specifically selected to correct variation with a defined portion of the population of power nodes. For example, a device may include multiple different power node connection ports coupled to dense tier power converters. Each connection port may be coupled to one or more dense tier power converters specifically selected to correct for expected variation within a defined portion of the population of power nodes. Additionally, the number of connection ports (e.g., across one or more multiple-port devices) dedicated to each portion of the population may be scaled relative to the relative size of that portion within the population. For example, a portion covering half a population of power nodes may have half of the total number of ports of devices using power nodes from the population configured for correcting for variation within that population. In some cases, the defined portions may be selected to ease such determinations. As an illustrative example, a set of power conversion devices may be designed to have 12 ports, each configurable to support a particular portion of a population of power nodes. The population may then be divided into 12 different portions of at least roughly equal size. In some cases, defined portions may be overlapping (or partially overlapping). Accordingly, a particular power node may be within the definition of two or more different portions. The diversity model may provide an expected range of different supported power flows for a portion.

Figure 2:
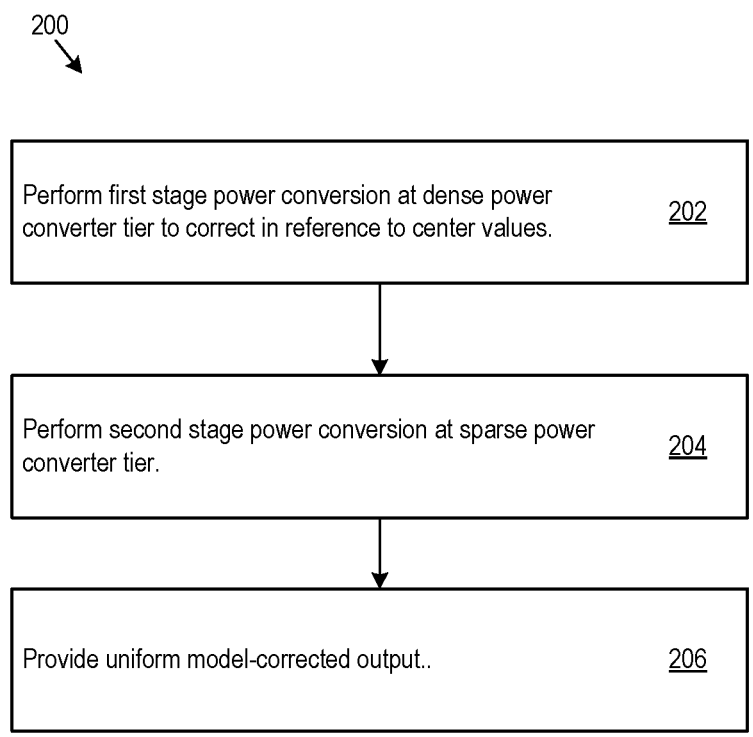
FIG. 2 shows example power conversion device logic.

Referring now to FIG. 1, an example power conversion device (PCD) 100 is shown. Reference is also made to FIG. 2, which shows PCD logic 200, which may govern the operation of the PCD 100. The example PCD 100 includes multiple power node connection ports 111-119. The each of the connection ports may be configured to support power conversion for a defined portion of the power node group of power nodes.

The diversity model may provide characteristics of the different portions. For example, the diversity model may provide a center value for expected power flow (such as a mean value, a median value, a selected value for ease of conversion in combination with other center values, or other value). For example, the diversity model may provide an expected range of power flows for the defined portion. In some cases, the defined portion may be defined based on power flow values. However, other characteristics may be used. For example, power node age, power node operating voltage, power node internal resistance (e.g., battery resistance or other internal resistance), power store charge-discharge cycle count, power node current, or other characteristics. In some cases, the populations may be statistically defined (e.g., a percentiles based on expected distributions due to power node age, cycle count, or other factors). Accordingly, membership of a particular power node within any particular portion of group may not be fully discernable. Hence, in some cases, the ports may be configured for different portions and then power nodes may be coupled to particular ports based on a best guess and/or best fit membership assignment. As an illustrative example, a particular PCD may have four ports tuned to different quartiles of total group of power nodes. At the time the PCD is placed into operation, power nodes may be partially characterized, for example, an operating voltage for each power node may be measured. Then, based on the partial characterization, the power nodes may be assigned based on a ranking of the characterized value. For example, in a best fit port assignment scheme the lowest operating voltage measured may be assumed to be best placed in the port of the lowest quartile, including in circumstances where the lowest measured operating voltage may be suggestive of membership in another quartile. In a best guess scheme, the measured characteristic may be used to estimate membership. For example, the lowest measured operating voltage may be assigned to the quartile indicated most strongly by the actual measured voltage value without consideration with regard to ranking in relationship to other power nodes characterized along with that power node at the time of its installation.

The PCD 100 further includes node interconnects 140 between the multiple power node connection ports 111-119. The node interconnects 140 may be configured to couple the power node connection portions 111-119 in a parallel or series configuration. In some cases, one or more series string of ports may be coupled in parallel to other individual ports. The PCD 100 further includes interconnects 130 between the multiple power node connection ports 111-119 and a sparse set of power converters 141, 142, 144. The sparse set works to adjust power at different points to ensure a final uniform model-corrected power at the port 150.

As discussed below, the interconnects may include dynamic switching to support reconfiguration of the connections over time. The switching may allow the power converter—power source connections to be changed after initial setup, for example, as a result of non-uniform degradation among the power sources. In some cases, dynamic reconfiguration may be applied in response to different use conditions. For example, the ports 111-119 may be switched such that they are coupled in series when power flows outward from the ports. For example, this may correspond to coupled batteries discharging during operation. However, the ports 111-119 may be switched such that they are couple in parallel when power flows inward to the ports. For example, this may correspond to coupled batteries charging.

The tier interconnects 130 may include a set of dense power converters 131-139 to provide a first stage adjustment (e.g., with partial power processing of the model-deviation power) the power node connection ports 111-119 in accord with the center values provided by the model. In some cases, such adjustment may include differential and/or partial conversion to an interim value that is selected in reference to the center values from the diversity model, but differs from the referenced center values. For example, an interim value may include a value corresponding to multiple center values added together, a difference between two center values, or other target value referencing the center values. In some cases, the interim values may be the center values from the diversity model. The model-deviation power may include the portion of the power that deviates from the center values provided by the diversity model. The dense set of power converters 131-139 may be connected in one or more tiers (which are be below the sparse set 141, 142, 144 within the hierarchy). The total number of tiers in the power converter hierarchy may include the number of tiers of dense set power 131-139 converters added to the number of tiers of sparse set of power converters.

The tier interconnects 130 further include passive connections (e.g., parallel, series, capacitive, inductive, power converting, and/or other interconnects) to assist in the adjustment. Accordingly, the tier interconnects 130 may not necessarily connect the power node connection ports one-to-one with dense tier power converters. For example, multiple series connected nodes may be used to estimate a desired operating voltage before connection to a power converter. Accordingly, the power from multiple node connection ports may be processed by a single converter. In some cases, for simplicity of analysis and/or presentation a complex electrical system may be referred to, depicted as, or reduced (via circuit equivalents) to a single node and/or single node connection port. In various implementations, connection ports may be permanently wired to a particular power node. Accordingly, a port may include a power interface for power flow out of and/or into a power node regardless of the permanent or temporary nature of the coupling of the interface.

In various implementations, the sparse set 141, 142, 144 may be fed by the interconnects 130 (and the dense set of power converters). The sparse set may provide partial power processing (204) to adjust the power from model-referenced interim values (e.g., which are approximated by the adjustment via the interconnects 130) to ensure the uniform model-corrected target power at the target port 150 (206). In other words, the sparse set of power converters provides partial power processing of the power (e.g., with taps as various points within the PCD) to obtain the power format used by the system being powered by the power sources.

Figure 3:
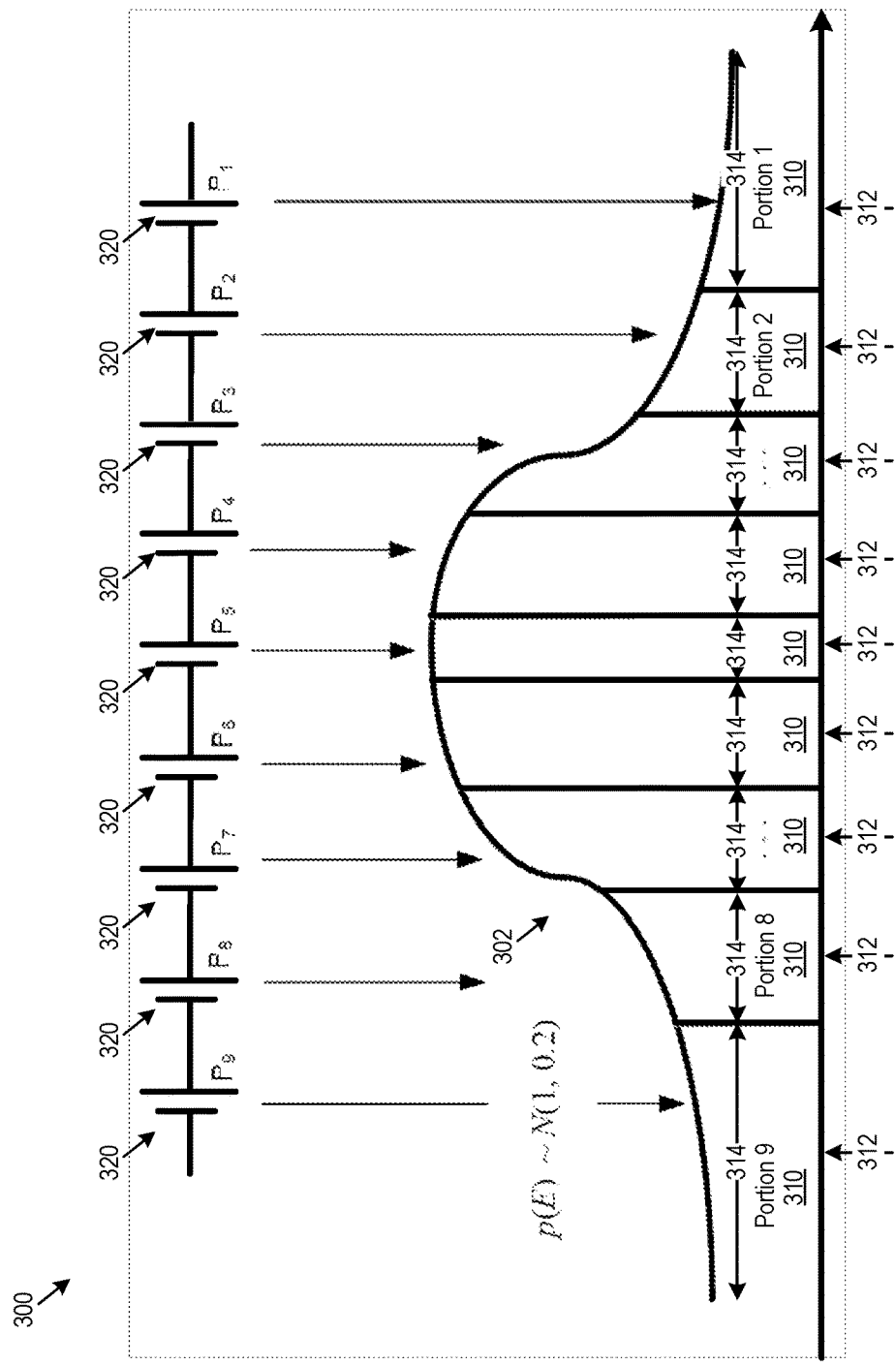
FIG. 3 shows example diversity model logic.

FIG. 3 shows example diversity model logic 300. The example diversity model logic 300 stores a distribution 302 of a power node population. The example diversity model logic 300 divides the power node population into defined portions 310. For each of the defined portions 310 a center value 312 and expected power flow range 314 is provided by the example diversity model logic 300. The example diversity model logic 300 them maps each of the populations to one or more power node connection ports 320 in a PCD structure.

Figure 4:
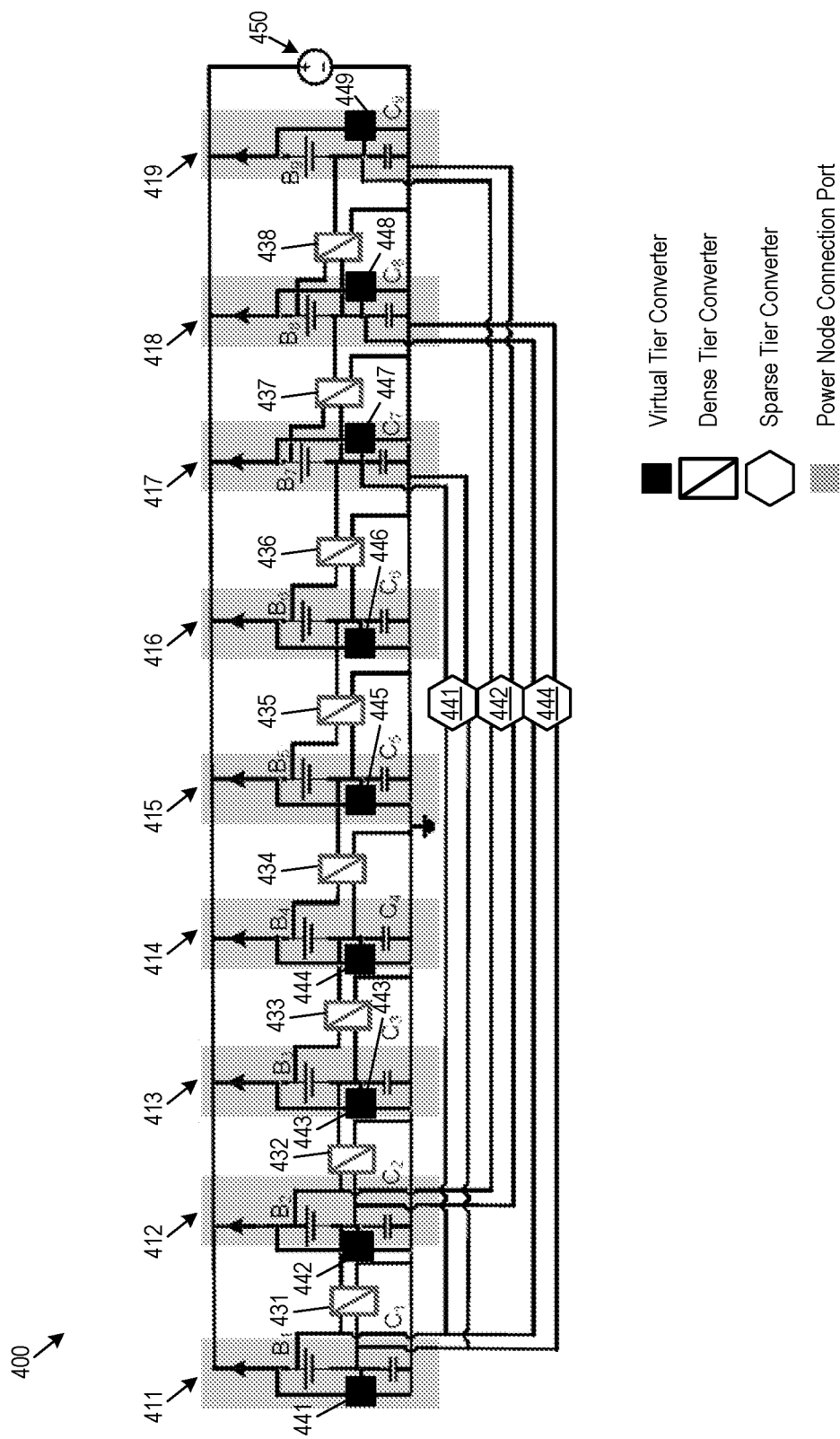
FIG. 4 shows an example parallel power conversion device.

FIG. 4 shows an example parallel PCD 400. In the example parallel PCD 400. The power node connection ports 411-419 are coupled in parallel to a target port 450 and the various sparse tier converters 441, 442, 444. The dense tier converters 431-438 may be coupled between the power node connection ports 411-419 and the sparse tier converters 441, 442, 444 using parallel and/or series connections.

In various example parallel partial power processing architectures, a virtual tier of power converters 441-449 may be used to allow for circuit duality based analysis. The virtual tier of power converters 441-449 may allow for the treatment of the power nodes as equal "current sources" rather than "voltage sources" for the purposes of circuit analysis. Thus, a series circuit may be reformed as a parallel circuit with the addition of such power converters. However, rather than providing physical converters to provide this "zero" stage conversion, the contribution of this virtual tier of power converters 441-449 may be subsumed into the operation of the dense tier converters 431-438. In some implementations, using the circuit duality may facilitate dual mode implementations. Accordingly, a PCD that operates in series in one mode may be converted to a parallel circuit using the virtual tier of power converters 441-449 when operating in a second mode. Thus, the adjustment to the operation of the dense tier converters 431-438 may be determined based on the virtual power conversion requirements when switching between series and parallel operation dynamically. Thus, in some cases, such virtualization may allow for simplification of dual mode operation.

Figure 5:
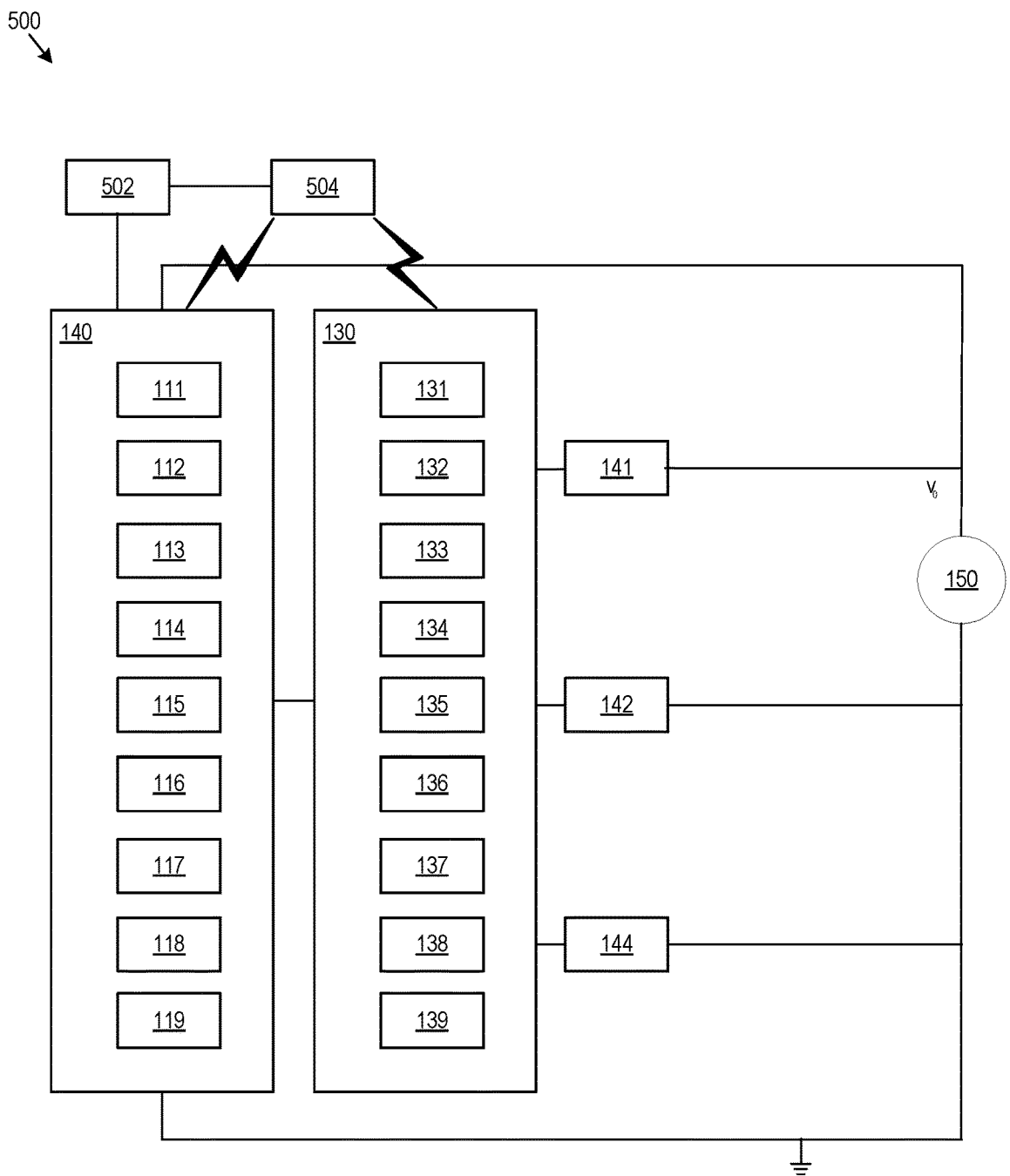
FIG. 5 shows an example dynamically switched power conversion device.
Figure 6:
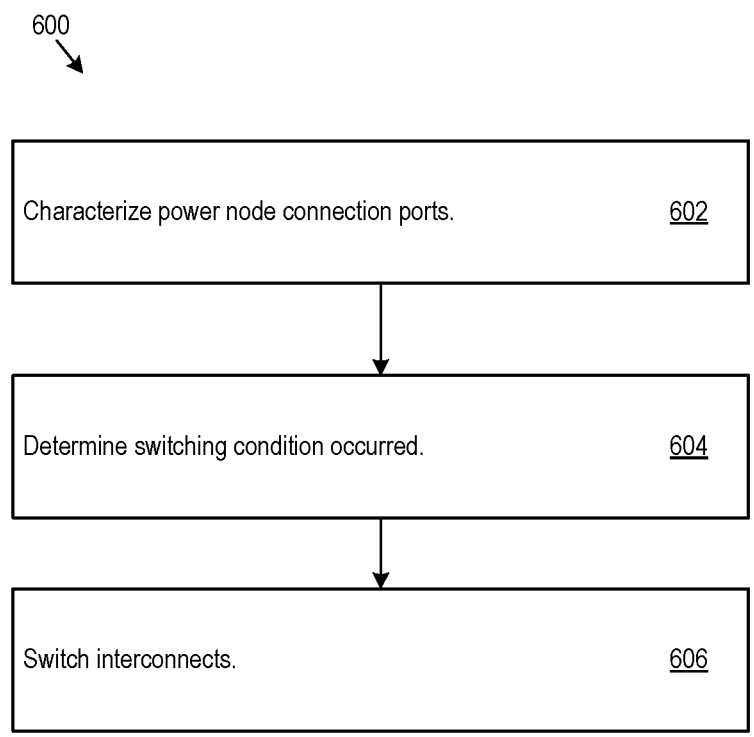
FIG. 6 shows example switching logic.

FIG. 5 shows an example dynamically switched PCD 500. Reference is also made to FIG. 6 which shows example switching logic 600, which may execute on meter circuitry 502 and switching circuitry 504.

The example dynamically switched PCD 500 may include meter circuitry 502 which may perform characterizations at the power node connection ports 111-119 (602). For example, the meter circuitry may characterize voltage, power storage capacity (e.g., via charge-discharge cycle voltage patterns, power flow over a charge-discharge cycle, or other cycle measurements), internal resistance, power flow, current flow, cycle count, power node age, or other power node behavior.

The switching circuitry 504 may include processing hardware to determine when a switching condition occurs (604). A switching condition may include a pre-determined condition for which a particular interconnection layout is assigned. For example, switching condition may include one or more thresholds for one or more characterized values. In an illustrative example, a switching condition may include a PCD exceeding a particular charge cycle count, and/or age from a reference point (such as initial installation). A switching condition may include a change in operation mode. For example, switching condition may include a reversal of power flow from the power node connection ports 111-119 (or other indication of a change from discharging to a charging mode). For example, the switching condition may include a determination that the power node connection ports 111-119 have transitioned from an initial non-diverse state to a diversity state (e.g., a state in which the initial uniform powers nodes currently exhibit different behaviors, such as a degradation state).

When a switching condition is determined to have occurred, the switching circuitry 504 may switch the interconnects 130, 140 to conform with an interconnect layout consistent with the determined switching condition (606).

For example, the switching circuitry 504 may recouple power node connection ports. For example, in a device interconnecting multiple batteries, aged batteries may degrade a different rates. One or more of the power node connection ports may be coupled to power converters sized to handle more significant degradation than others of the power node connection ports. Accordingly, the switching circuitry may recouple to ports to dedicate the particularly sized converters to the batteries that underwent the most significant degradation based on measurements from the meter circuitry 502. Similarly, the batteries that underwent the least significant degradation may be switched to power converters particularly sized for lower degradation. Initially, the non-diverse state of the batteries may allow for any of the batteries to be equally well served by any of the power node connection ports despite the different sizing of their coupled power converters.

In another example, the switching circuitry 504 may determine that PCD 500 power flow has been reversed (or will be reversed imminently, such through indication of the PCD being plugged in or unplugged from a charger). The switching circuitry 504 may switch the interconnects 130, 140 from a charging layout to a discharge layout or vice versa. In an illustrative example, the switching circuitry 504 may switch between a parallel interconnect layout when charging to a series interconnect layout when discharging. In some cases, the switching circuitry 504 may also cause the dense tier converters 131-139 to implement (or cease) virtual tier power processing to support circuit duality transformations from series to parallel operation (or vice versa).

Example Implementations

The example implementations below are included as illustrations of the general techniques and architectures discussed above. The any of the features or any grouping of the features discussed with regard to the example implementations may be present or absent in other implementations.

Figure 7:
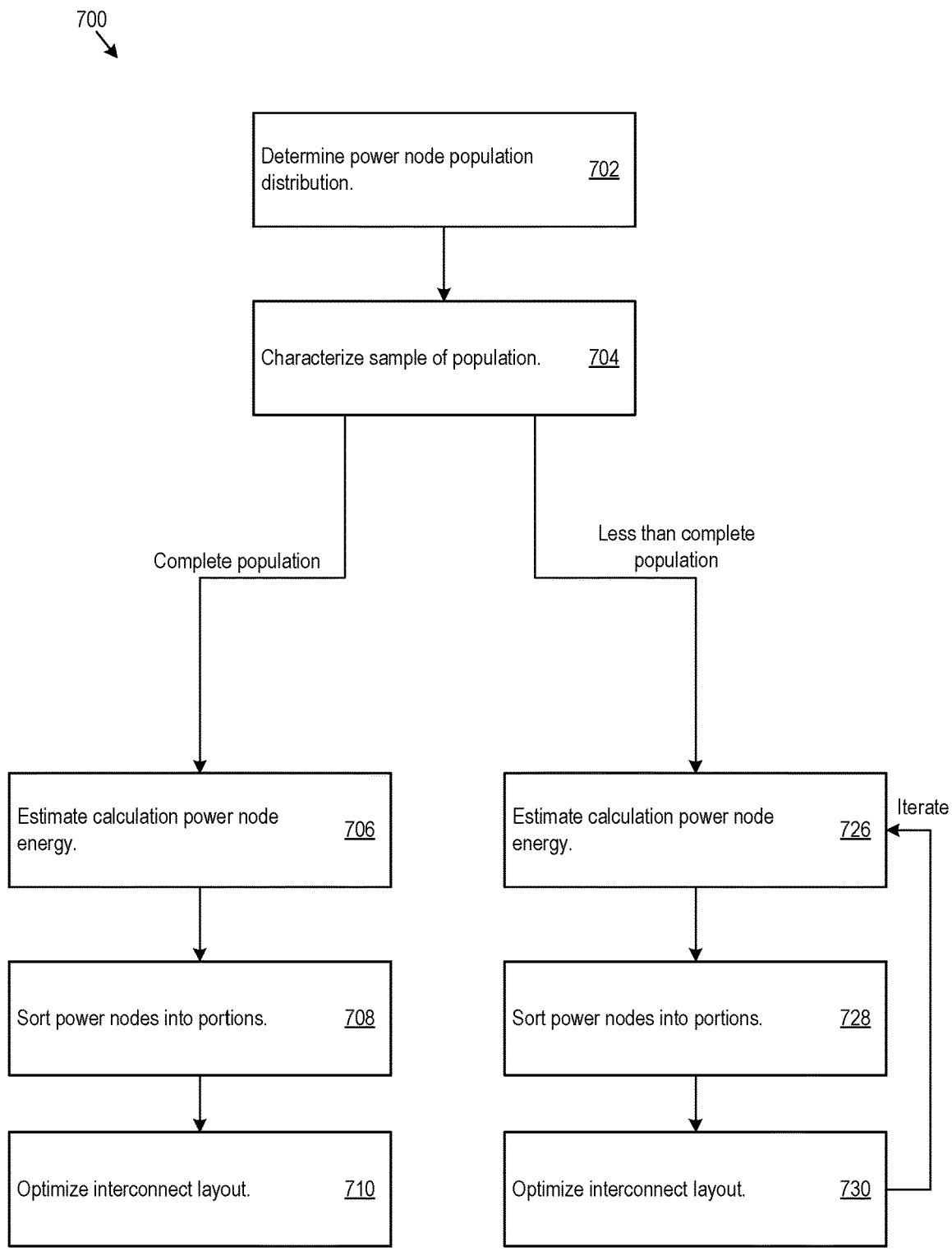
FIG. 7 shows example sizing logic.

FIG. 7 shows example sizing logic 700 for determining a power converter sizing distribution based on a distribution of power nodes. The sizing logic 700 may determine a power node population distribution (702). Based on the distribution, an initial PCD layout may be selected by the sizing logic 700. The logic may characterize a sample of the population (704). If the sample includes the entire population, the sizing logic 700 may estimate/calculate the power node energy for each power node (706), sort the power nodes into portions (708), and optimize the layout of the PCD interconnects (710). If the sample is less than the entire population, the sizing logic 700 may estimate/calculate the power node energy for each power node (726), sort the power nodes into portions (728), optimize the layout of the PCD interconnects (730), and apply simulations (such as Monte-Carlo simulations) to determine average performance based on population. With a sample that is less than the entire population, the sizing logic 700 may iterate the testing-simulation cycle until average performance (or other measure of performance variance) reaches a threshold level.

The sizing logic 600 may perform the optimization of the PCD interconnect layout iteratively by power converter tier, while optimizing layout from lowest (most dense) to highest (most sparse) tier. In some cases, convex programming and or linear programming may be employed to optimize the tiers.

Figure 8:
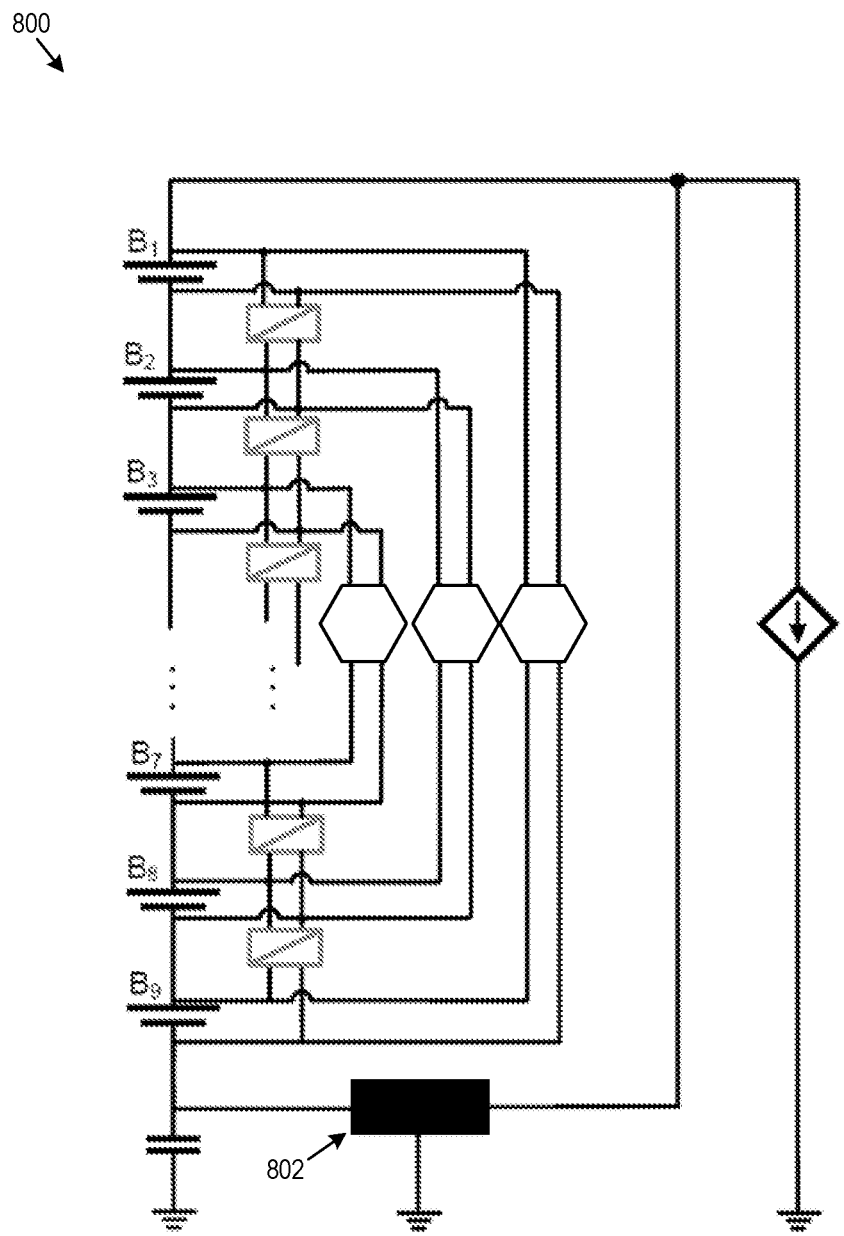
FIG. 8 shows an example power conversion device with a bus voltage regulator.

Referring now to FIG. 8, an example PCD 800 with a bus voltage regulator 802 is shown. The bus voltage regulator may be used to ensure constant voltage target and to remove power conversion induced noise.

Figure 9:
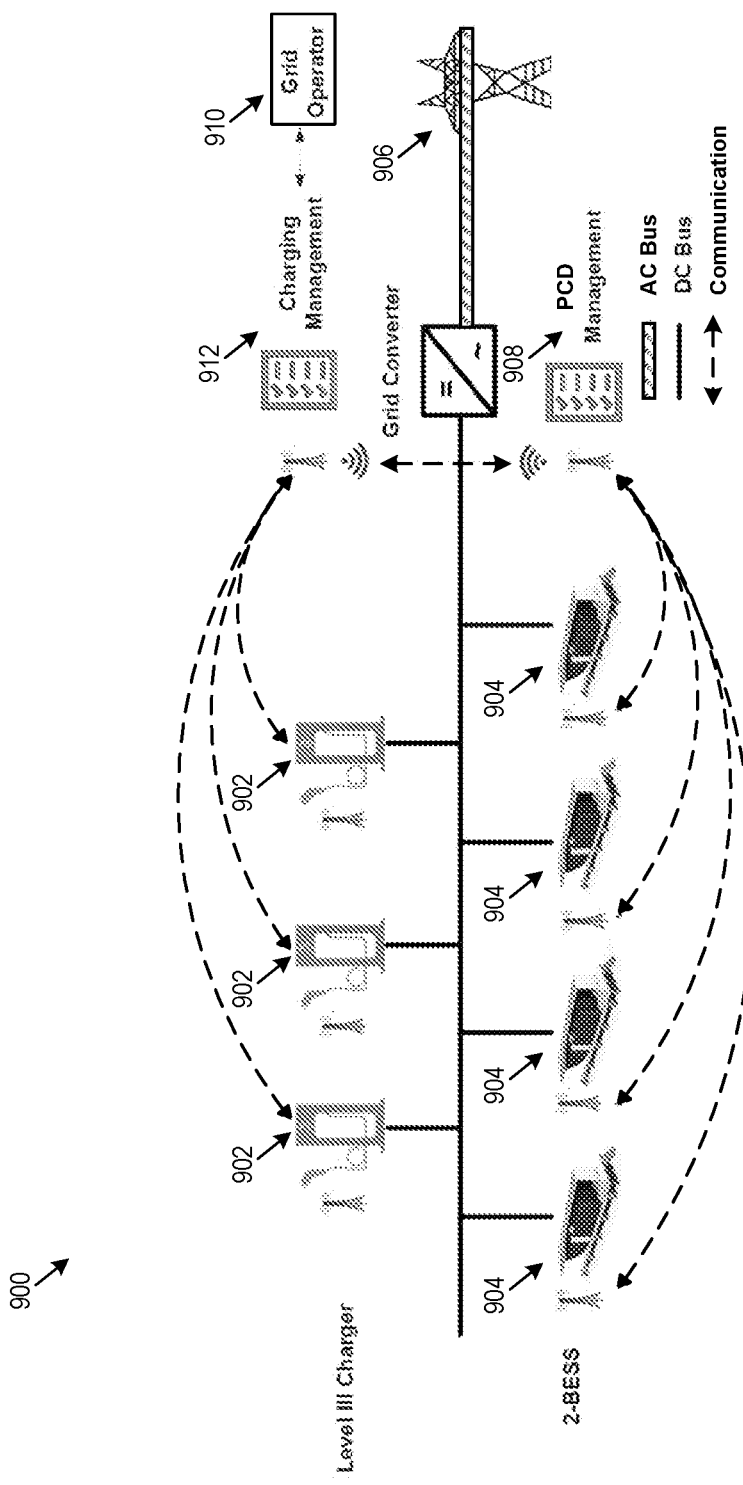
FIG. 9 shows an example electric vehicle charging plaza.

Referring now to FIG. 9, an example electric vehicle (EV) charging plaza 900 is shown. Chargers 902 (which may be Level I, II, III or other EV charging standard) may be supplied by one or more PCDs 904 (which may include second use batteries as a power store) may be maintained at the plaza location. The PCDs 904 may be used to buffer power draw from the grid 906. In some cases, the PCDs 904 may be charged at times when power able to be generated via renewable sources (e.g., during times of sun or wind at power generation locations). Other times for PCD charging may be selected such as timing based on power cost, timing based on peak usage avoidance, or other power generation factors. The PCD management system 908 may received data from the grid control 910 regarding timing for PCD charging. The PCD management system 908 may coordinate with the charging management system 912 to control when power should be drawn from the PCDs 904 and when power should be drawn from the grid for charging.

Figure 10:
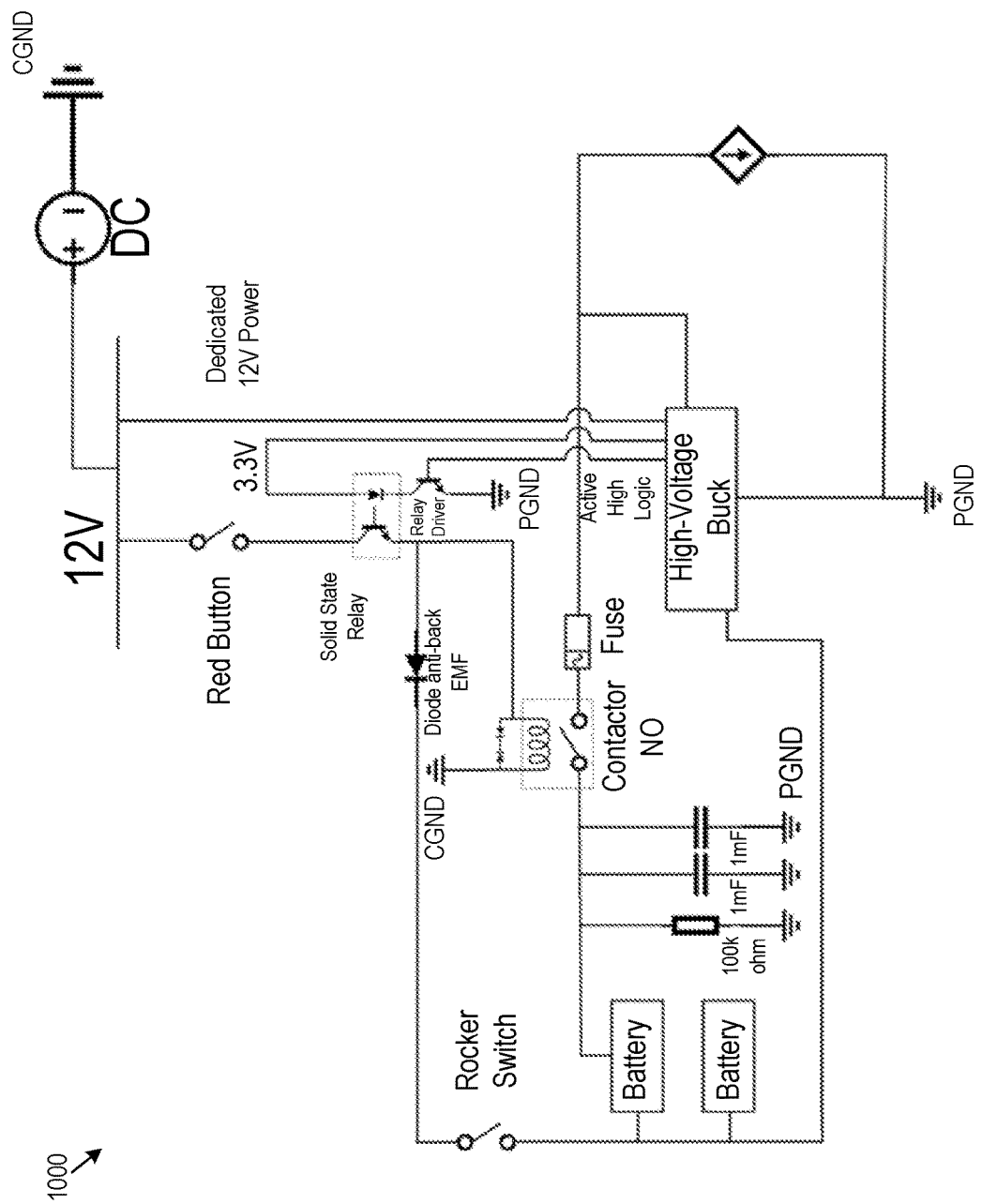
FIG. 10 shows an example power conversion device with fault protection.

Referring now to FIG. 10, an example PCD 1000 with fault protection is shown. The addition of fault protection may aid in situation of power node failure, which may be expected to increase in frequency with increasing power node age.

Various example implementations have been included for illustration. Other implementations are possible.

TABLE 2

Examples

E1. A device including:
multiple power store connection ports including:
    a first connection port to support a first power flow range, the first power flow range
      spanning one or more first expected power flow levels for a first defined portion of a
      group of power stores; and
    a second connection port to support a second power flow range, the second power
      flow range spanning one or more second expected power flow levels for a second
      defined portion of the group of power stores; and
a dense converter tier coupled to the multiple power store connection ports, the dense
    converter tier including:
      a first dense tier power converter coupled to at least the first connection port, the first
        dense tier power converter configured to convert from within the first power flow
        range to a first interim power flow, a level of the first interim power flow selected
        based on a diversity model for the group of power stores; and
      a second dense tier power converter coupled at least to the second connection port,
        the second dense tier power converter configured to convert from within the second
        power flow range to a second interim power flow, a level of the second interim power
        flow selected based on the diversity model for the group of power stores; and
a sparse converter tier coupled to the multiple power store connection ports via the dense
    converter tier, the sparse converter tier a sparse tier power converter configured to convert
    a combined power flow to a uniform model-corrected target, the combined power flow
    including at least a portion of each of the first and second interim power flows, where
optionally, the device is in accord with or implemented by any other example in this table.

TABLE 2-continued

Examples

E2. The device of any example in this table, where:
the first dense tier power converter is coupled to multiple ones of the multiple power store
   connection ports; and
the first dense tier power converter configured to convert from within the first power flow
   range to the first interim power flow by converting a differential power flow from the multiple
   ones of the multiple power store connection ports to the first interim power flow.
E3. The device of any example in this table, where the multiple power store connection
   ports are coupled in parallel to a target port.
E4. The device of example 3 or any other example in this table, where at least one of the
   multiple power store connection ports is configured to support coupling to a series of power
   stores as a single power store unit coupled with others of the power store connection ports
   in parallel to the target port.
E5. The device of any example in this table, where the diversity model includes a power
   store degradation model.
E6. The device of example 5 or any other example in this table, where the power store
   degradation model includes a model of degradation based on:
power store age;
power store type;
power store charge-discharge cycle count; or
any grouping of the foregoing.
E7. The device of example 5 or any other example in this table, where the first and second
   defined portions include portions of the group of power stores corresponding to an expected
   distribution of degradation levels for the group of power stores according to the diversity
   model.
E8. The device of example 7 or any other example in this table, where the first and second
   defined portions are selected such that the expected distribution results in an equal number
   of power stores in each of the first and second defined portions.
E9. The device of example 8 or any other example in this table, where:
the actual distribution of degradation levels in the group of power stores deviates from the
   expected distribution; and
the first and second defined portions include a different number of power stores from the
   group of power stores.
E10. The device of example 5 or any other example in this table, where the first and second
   defined portions include portions of the group of power stores corresponding to a
   distribution of degradation levels based on:
the diversity model; and
a characterization of at least some of the group of power stores.
E11. The device of example 5 or any other example in this table, where the first and second
   defined portions include portions of the group of power stores corresponding to an individual
   assignment of each power store in the group of power stores to a corresponding portion.
E12. The device of any example in this table, where the group of power stores include a
   group of batteries.
E13. A device including:
multiple power store connection ports configured to support coupling to multiple power stores
   while the multiple power stores degrade from a non-diverse state to into a degradation
   state, a diversity model providing an expected degradation distribution for the multiple
   power stores in the degradation state;
a dense converter tier dynamically coupled to the multiple power store connection ports, the
   dense converter tier including:
       a first dense tier power converter dynamically coupled to the multiple power store
          connection ports, the first dense tier power converter configured to convert from
          within a first power flow range to a first interim power flow, a level of the first interim
          power flow determined based on the diversity model; and
       a second dense tier power converter dynamically coupled to the multiple power store
          connection ports, the second dense tier power converter configured to convert from
          within a second power flow range to a second interim power flow, a level of the
          second interim power flow determined based on the diversity model; and
a sparse converter tier coupled to the multiple power store connection ports via the dense
   converter tier, the sparse converter tier a sparse tier power converter configured to convert
   a combined power flow to a uniform model-corrected target, the combined power flow
   including at least a portion of each of the first and second interim power flows, where
optionally, the device is in accord with or implemented by any other example in this table.
E14. The device of any example in this table, further including meter circuitry configured to
   characterize a current degradation level, from one or more of the multiple power store
   connection ports.
E15. The device of example 14 or any other example in this table, where the meter circuitry
   is configured to characterize the current degradation level by measuring:
a voltage at the one or more of the multiple power store connection ports;
a power store capacity for a power store coupled to the one or more of the multiple power
   store connection ports;
a current flow at the one or more of the multiple power store connection ports;
an internal resistance for a power store coupled to the one or more of the multiple power
   store connection ports; or
any grouping of the foregoing.
E16. The device of example 14 or any other example in this table, further including
   switching circuitry configured to dynamically couple the dense converter tier to the multiple
   power store connection ports based on the characterization of the current degradation level.

TABLE 2-continued

Examples

E17. The device of any example in this table, where the non-diverse state includes a new installation state.
E18. A method including:
for multiple power store connection ports including:
- a first connection port to support a first power flow range, the first power flow range spanning one or more first expected power flow levels for a first defined portion of a group of power stores; and
- a second connection port to support a second power flow range, the second power flow range spanning one or more second expected power flow levels for a second defined portion of the group of power stores; and executing a first stage of power processing at a dense converter tier coupled to the multiple power store connection ports, by:
- at a first dense tier power converter coupled to at least the first connection port, converting from within the first power flow range to a first interim power flow, a level of the first interim power flow selected based on a diversity model for the group of power stores; and
- at a second dense tier power converter coupled to at least the second connection port, converting from within the second power flow range to a second interim power flow, a level of the second interim power flow selected based on the diversity model for the group of power stores; and executing a second stage of power processing at a sparse converter tier coupled to the multiple power store connection ports via the dense converter tier, by converting a combined power flow to a uniform model-corrected target, the combined power flow including at least a portion of each of the first and second interim power flows, where optionally, the method is in accord with or implemented by any other example in this table.
E19. The method of any example in this table, where executing the first and second stages of power processing include partially processing power from the multiple power store connection ports.
E20. The method of any example in this table, where:
the first power flow range defines an expected range of power flow level deviations a center power flow value for the first defined portion of the group of power stores provided by the diversity model; and
converting from within the first power flow range to the first interim power flow includes partially processing a portion of power flow from the first connection port that causes deviation from the center power flow value.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A device including:
multiple power store connection ports including:
a first connection port to support a first power flow range, the first power flow range spanning one or more first expected power flow levels for a first defined portion of a group of power stores; and
a second connection port to support a second power flow range, the second power flow range spanning one or more second expected power flow levels for a second defined portion of the group of power stores; and
a dense converter tier coupled to the multiple power store connection ports, the dense converter tier including:
a first dense tier power converter coupled to at least the first connection port, the first dense tier power converter configured to convert from within the first power flow range to a first interim power flow, a level of the first interim power flow selected based on a diversity model for the group of power stores; and
a second dense tier power converter coupled at least to the second connection port, the second dense tier power converter configured to convert from within the second power flow range to a second interim power flow, a level of the second interim power flow selected based on the diversity model for the group of power stores; and
a sparse converter tier coupled to the multiple power store connection ports via the dense converter tier, the sparse converter tier a sparse tier power converter configured to convert a combined power flow to a uniform model-corrected target, the combined power flow including at least a portion of each of the first and second interim power flows.

2. The device of claim 1, where:
the first dense tier power converter is coupled to multiple ones of the multiple power store connection ports; and
the first dense tier power converter configured to convert from within the first power flow range to the first interim power flow by converting a differential power flow from the multiple ones of the multiple power store connection ports to the first interim power flow.

3. The device of claim 1, where the multiple power store connection ports are coupled in parallel to a target port.

4. The device of claim 3, where at least one of the multiple power store connection ports is configured to support coupling to a series of power stores as a single power store unit coupled with others of the power store connection ports in parallel to the target port.

5. The device of claim 1, where the diversity model includes a power store degradation model.

6. The device of claim 5, where the power store degradation model includes a model of degradation based on:
power store age;
power store type;
power store charge-discharge cycle count; or
any grouping of the foregoing.

7. The device of claim 5, where the first and second defined portions include portions of the group of power stores corresponding to an expected distribution of degradation levels for the group of power stores according to the diversity model.

8. The device of claim 7, where the first and second defined portions are selected such that the expected distribution results in an equal number of power stores in each of the first and second defined portions.

9. The device of claim 8, where:
the actual distribution of degradation levels in the group of power stores deviates from the expected distribution; and
the first and second defined portions include a different number of power stores from the group of power stores.

10. The device of claim 5, where the first and second defined portions include portions of the group of power stores corresponding to a distribution of degradation levels based on:
the diversity model; and
a characterization of at least some of the group of power stores.

11. The device of claim 5, where the first and second defined portions include portions of the group of power stores corresponding to an individual assignment of each power store in the group of power stores to a corresponding portion.

12. The device of claim 1, where the group of power stores include a group of batteries.

13. A device including:
multiple power store connection ports configured to support coupling to multiple power stores while the multiple power stores degrade from a non-diverse state to into a degradation state, a diversity model providing an expected degradation distribution for the multiple power stores in the degradation state;
a dense converter tier dynamically coupled to the multiple power store connection ports, the dense converter tier including:
a first dense tier power converter dynamically coupled to the multiple power store connection ports, the first dense tier power converter configured to convert from within a first power flow range to a first interim power flow, a level of the first interim power flow determined based on the diversity model; and
a second dense tier power converter dynamically coupled to the multiple power store connection ports, the second dense tier power converter configured to convert from within a second power flow range to a second interim power flow, a level of the second interim power flow determined based on the diversity model; and
a sparse converter tier coupled to the multiple power store connection ports via the dense converter tier, the sparse converter tier a sparse tier power converter configured to convert a combined power flow to a uniform model-corrected target, the combined power flow including at least a portion of each of the first and second interim power flows.

14. The device of claim 13, further including meter circuitry configured to characterize a current degradation level, from one or more of the multiple power store connection ports.

15. The device of claim 14, where the meter circuitry is configured to characterize the current degradation level by measuring:
a voltage at the one or more of the multiple power store connection ports;
a power store capacity for a power store coupled to the one or more of the multiple power store connection ports;
a current flow at the one or more of the multiple power store connection ports;
an internal resistance for a power store coupled to the one or more of the multiple power store connection ports; or
any grouping of the foregoing.

16. The device of claim 14, further including switching circuitry configured to dynamically couple the dense converter tier to the multiple power store connection ports based on the characterization of the current degradation level.

17. The device of claim 13, where the non-diverse state includes a new installation state.

18. A method including:
for multiple power store connection ports including:
a first connection port to support a first power flow range, the first power flow range spanning one or more first expected power flow levels for a first defined portion of a group of power stores; and
a second connection port to support a second power flow range, the second power flow range spanning one or more second expected power flow levels for a second defined portion of the group of power stores; and
executing a first stage of power processing at a dense converter tier coupled to the multiple power store connection ports, by:
at a first dense tier power converter coupled to at least the first connection port, converting from within the first power flow range to a first interim power flow, a level of the first interim power flow selected based on a diversity model for the group of power stores; and
at a second dense tier power converter coupled to at least the second connection port, converting from within the second power flow range to a second interim power flow, a level of the second interim power flow selected based on the diversity model for the group of power stores; and
executing a second stage of power processing at a sparse converter tier coupled to the multiple power store connection ports via the dense converter tier, by converting a combined power flow to a uniform model-corrected target, the combined power flow including at least a portion of each of the first and second interim power flows.

19. The method of claim 18, where executing the first and second stages of power processing include partially processing power from the multiple power store connection ports.

20. The method of claim 18, where:
the first power flow range defines an expected range of power flow level deviations a center power flow value for the first defined portion of the group of power stores provided by the diversity model; and
converting from within the first power flow range to the first interim power flow includes partially processing a portion of power flow from the first connection port that causes deviation from the center power flow value.

* * * * *